United States Patent Office 3,105,290
Patented Oct. 1, 1963

3,105,290
CATHODE FOR ELECTRON DISCHARGE DEVICE
James P. Sackinger, Corning, and Gene R. Feaster, Horseheads, N.Y., assignors to Westinghouse Electric Corporation, East Pittsburgh, Pa., a corporation of Pennsylvania
No Drawing. Filed Dec. 18, 1958, Ser. No. 781,209
3 Claims. (Cl. 29—182.5)

This invention relates to cathodes and, more particularly, to refractory cathodes, commonly designated as cermet cathodes, suitable for use in electron discharge devices.

Some cermet (ceramic-metal cathodes) have previously been made by powder metallurgy techniques from a mixture of a matrix metal such as tungsten (wolfram), ditungsten carbide and thorium metal. Such cathodes perform very well when properly made but are difficult to make reproducibly. It is thought that the reasons for manufacturing difficulties stem from the high reactivity of metallic thorium. More specifically, the thorium in the cathode is converted to thorium oxide by reaction with the water and/or oxygen in the air. This reaction occurs whether or not ditungsten carbide is in the cathode mixture before the sintering step because, even though all or part of the thorium may combine with the carbon in the ditungsten carbide to form thorium carbide, this latter compound is also unstable in air. Thorium carbide reacts with the moisture in the air to give acetylene and thorium oxide, which fact is evidenced by the strong odor of acetylene which accompanies the exposure of this type cathode to air.

In general, our invention relates to making refractory cathodes by a powder metallurgy process in which the thorium metal is desensitized by alloying the thorium metal with a suitable refractory carrier metal.

Accordingly, it is an object of this invention to provide an improved refractory cathode.

It is another object to provide an improved refractory cathode suitable for use in an electron discharge device.

It is a further object to provide an improved refractory cathode manufactured from an alloy of thorium and a refractory carrier metal.

It is an additional object to provide an improved method for making a refractory cathode which is suitable for use in electron discharge devices.

These and other objects of our invention will be apparent from the following description.

There are a variety of processes by which a suitable refractory cathode may be made, yet which all use our alloying principle. In one particular embodiment of our invention, the thorium is alloyed with a refractory carrier metal during the sintering step in the formation of the cathode. For example, a cermet cathode suitable for use in a magnetron may be made by mixing 89.5% powdered tungsten, 10% powdered ditungsten carbide and 0.5% of a powdered thorium-containing material such as thorium hydride. These materials are mixed with a small amount, for example, 1% of a suitable thermally removable organic binder and lubricant such as paraffin or stearic acid or the compound known as "sterotex," which in effect is hydrogenated cottonseed oil. The above percentages are by weight, of course. After thoroughly mixing the above ingredients, the mixture may be prepared in a suitable mold with a pressure of approximately 100,000 p.s.i. When the cathode is to be used in a magnetron, a hollow cylindrical shape is desired which may be obtained by use of a suitably shaped mold.

After the pressing operation, the mixture is then sintered in a suitable non-decarburizing atmosphere, such as dry hydrogen or vacuum at a temperature of at least 2400° C. for about 15 to 60 minutes. In prior art cathodes which were somewhat similar, it was the usual practice to use temperatures of approximately 2000° C. While in some applications, these cathodes were adequate, it has been found that by heating these cathodes at a temperature of at least 2400° C., thorium is alloyed with the refractory carrier metal, such as tungsten, and there is no trouble experienced with the thorium reacting with air or other materials after the sintering stage. Therefore, the cathodes may be easily stored and may be used when desired without special precautions. In this particular embodiment in some instances, it may be desirable to use other refractory carrier metals, such as molybdenum or rhenium in place of the tungsten. Also, the ditungsten carbide may be partially or wholly replaced by monotungsten carbide, monomolybdenum carbide or dimolybdenum carbide. Also, if desired in this particular embodiment, thorium metal itself may be used rather than thorium hydride in which case it may be desirable to fire the cathode in a vacuum or a noble gas to avoid possible cracking of the cathode.

The proportion of the refractory carrier metal and the thorium-containing material can be varied within fairly wide limits, for example, the refractory carrier metal (such as tungsten, molybdenum or rhenium) may range from 60% to 98% by weight and the thorium-containing material may be varied between 0.1% and 10%. While we have also found that the percentages of refractory metal carbide may be varied from 1% to 30%, it is usually kept at about 10% of the total. In this particular embodiment, it is only necessary to have one heating or firing step, but it must be at a temperature of 2400° C. or above.

In another embodiment of our invention, a refractory cathode suitable for use in a magnetron may be made by a "pre-alloy" method in which the thorium alloy is formed before the sintering step. This has the advantage that the temperatures used need not be so high. Tantalum (used as a carrier metal for the thorium) sheet is heated to approximately 1800° C. in a hydrogen atmosphere and then cooled slowly to form tantalum hydride. The tantalum hydride is then crushed in a mortar and is sieved through a suitable screen such as a 325 mesh screen. Then the powdered tantalum hydride is mixed with a powdered thorium-containing material, such as thorium metal powder, with the tantalum hydride varying between 98% and 50% by weight. One particularly suitable mixture we have used is that which utilizes 75% by weight of tantalum hydride and 25% by weight of thorium metal. This mixture is then heated for a period of at least 5 minutes in a dry hydrogen atmosphere at a temperature above 1850° C. and is cooled slowly. We have found that if this mixture is heated for approximately twenty minutes at a temperature of approximately 1900° C., a suitable lump of hydrided tantalum thorium alloy is formed which is easily reduced to a fine powder in a mortar. This is a stable alloy which can be stored in air indefinitely and used as needed.

To make the actual cathode by the pre-alloy method, in one particular embodiment powdered tungsten, powdered ditungsten carbide and the powdered hydrided thorium-tantalum alloy are mixed in the approximate proportions of 88% by weight of tungsten, 10% by weight of ditungsten carbide and 2% by weight of the hydrided thorium-tantalum alloy. To this powder mix approximately 1% by weight of a suitable thermally removable organic binder and lubricant is added. After thoroughly mixing the above ingredients, the mixture is pressed in a suitable mold with a pressure of approximately 100,000 p.s.i.

After the pressing operation the mixture is then sintered in a suitable non-decarburizing atmosphere, such as dry hydrogen or vacuum, at a temperature of approximately 2000° C. for a period of about 5 to 60 minutes. In one particular embodiment of our invention, a 20 minute sintering period has been found to be satisfactory. It is desired to sinter the above mixture in a suitable atmosphere such as a dry hydrogen in order not to decarburize the ditungsten carbide. Of course, other non-decarburizing atmospheres, such as a vacuum or a noble gas may be used, if desired.

After the cathode is assembled in a suitable electron discharge device, it is then heated in a vacuum to a temperature of approximately 1650° C. in order to outgas the cathode and remove the hydrogen which it contains and to diffuse thorium from its alloy form to the surface of the cathode where it performs its function of lowering the work function.

Also with the pre-alloying method, it may be desirable in some instances to use other refractory metals such as molybdenum or rhenium in place of the tungsten of the matrix metal. Also, the ditungsten carbide may be partly or wholly replaced by other carbides of tungsten or molybdenum, such as tungsten monocarbide, monomolybdenum carbide or dimolybdenum carbide. With the above pre-alloying method of forming the alloy of thorium and the carrier metal, other suitable carrier metals may be used such as niobium (columbium), zirconium and hafnium. All of these materials hydride easily and, therefore, become frangible and lend themselves to the above method of preparation. With other methods of powder metallurgy it is possible to use refractory, noble metals, such as osmium, ruthenium and iridium.

In the pre-alloying method also, the proportions of the various materials may be varied within fairly wide limits and still form satisfactory cathodes. For example, the refractory metal matrix (such as tungsten, molybdenum or rhenium) may range from 60% to 98% by weight and the hydrided thorium-tantalum alloy may be varied between 0.1% and 10% by weight. While we have also found that the percentages of the refractory metal carbide may be varied from 1% to 30% by weight, it is usually kept at about 10% of the total.

We have found that if a refractory cathode is made in the above manner, it is sound and has desirable emission capabilities. These cathodes not only provide an operating life in magnetron operation which is equivalent to that of a current standard cathode but also provide markedly improved reproducibility.

When a cathode of this type is mounted in a magnetron and properly treated, the necessary high peak emission can be obtained immediately at temperatures in the neighborhood of 1500° C. Also, such a cathode is particularly suitable for dissipating the large amounts of back-bombardment power encountered at very high power levels with a minimum of evaporated gaseous products. In general, a cathode manufactured by the above methods forms a reliable, high temperature, high emission cathode which is particularly suitable for use in magnetrons and other electron discharge devices.

Thus, it is seen that we have disclosed a method of making a cathode in which thorium is included in the electron emissive material of the cathode and in which this thorium is alloyed with a refractory carrier metal in order to densensitize the thorium, which prevents it from reacting with air and other materials and provides a very stable cathode which may be stored for long periods without special precautions.

While the present invention has been described in a few forms only, it will be obvious to those skilled in the art that it is not so limited but is susceptible to various changes and modifications without departing from the spirit and scope thereof.

We claim as our invention:

1. A method of making a refractory cathode comprising the steps of establishing a quantity of powdered material consisting essentially of by weight: 0.002% to 5% of thorium containing material selected from the group consisting of thorium and thorium hydride; 60% to 98% of at least one first refractory metal selected from the group consisting of tungsten, molybdenum and rhenium; 1% to 30% of at least one refractory metal carbide selected from the group consisting of tungsten carbide, ditungsten carbide, molybdenum carbide and dimolydenum carbide; and 0.05% to 9.8% of at least one second refractory metal selected from the group consisting of tantalum, niobium, zirconium, hafnium, osmium, ruthenium and iridium; forming a first mixture of said thorium containing material and said second refractory metal; heating said first mixture to a temperature of at least 1850° C. to form an alloy; dividing said alloy into a powder; forming a second mixture of said alloy, said first refractory metal and said refractory metal carbide and heating said second mixture to about 2000° C. to produce a sintered mass.

2. A refractory cathode including a sintered mass consisting essentially of by weight: 0.002% to 5% thorium; 60% to 98% of at least one first refractory metal selected from the group consisting of tungsten, molybdenum and rhenium; 1% to 30% of at least one refractory metal carbide selected from the group consisting of tungsten carbide, ditungsten carbide, molybdenum carbide and dimolybdenum carbide; and 0.05% to 9.8% of at least one second refractory metal selected from the group consisting of tantalum, niobium, zirconium, hafnium, osmium, ruthenium and iridium; said thorium being present in an alloy with said second refractory metal.

3. A refractory cathode including a sintered mass consisting essentially of by weight: 0.5% thorium, 88% tungsten, 10% ditungsten carbide and 1.5% tantalum, said thorium being present in an alloy with said tantalum.

References Cited in the file of this patent

UNITED STATES PATENTS

| | | |
|---|---|---|
| 1,205,080 | Baumann | Nov. 14, 1916 |
| 1,732,326 | Cooper | Oct. 22, 1929 |